Patented Aug. 10, 1926.

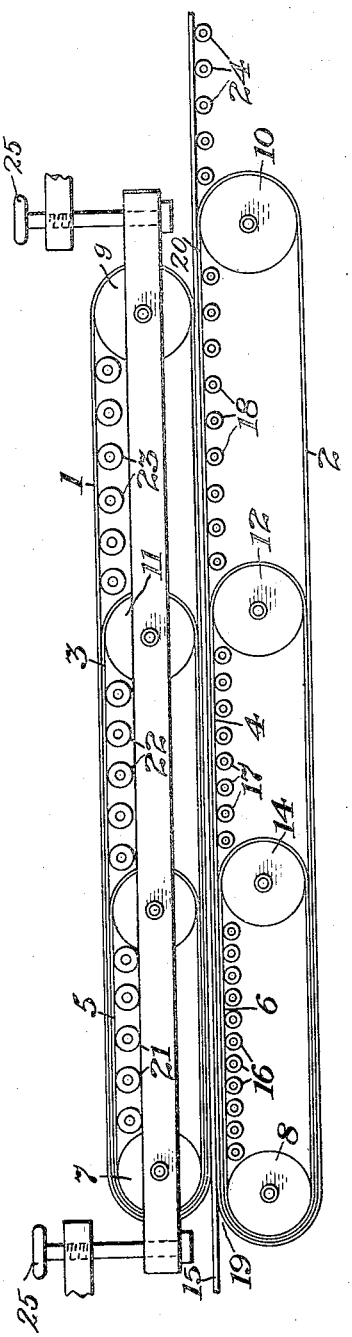

1,595,103

UNITED STATES PATENT OFFICE.

CHARLES B. KINGSLEY, OF ELIZABETH, PENNSYLVANIA, ASSIGNOR TO MISSISSIPPI GLASS COMPANY, A CORPORATION OF NEW YORK.

METHOD OF AND APPARATUS FOR TREATING MOLTEN MATERIALS.

Application filed March 21, 1924. Serial No. 700,751.

My present invention relates to methods of and apparatus for treating materials between the melting thereof and the solidifying thereof to prevent the too rapid cooling thereof and to secure desired annealed conditions in such materials. It relates particularly to the method of conserving and utilizing the latent heat of fusion of molten glass for the cooling thereof to effect the annealing of the glass as it cools. It relates further to apparatus for carrying out such methods and to methods of operation of such apparatus, and my invention is applicable generally in the arts.

My invention relates more particularly to methods in the manufacture of sheet glass which comprises passing the molten glass directly as it comes from the forming rolls to and through a chamber, the material of whose walls has a low heat conductivity but which conductivity increases or is increased progressively in the direction of the movement of the glass therethrough for the purpose of conserving the latent heat of fusion of the glass and utilizing such heat to effect the slow or the gradual cooling of the glass with the result that the cooled glass is free of strains and hardness which would ordinarily result from the too rapid cooling thereof.

My invention further relates to a lehr for receiving sheet glass from a furnace, such lehr having a floor of material of low heat conductivity and a roof of similar material therefor mounted in close proximity thereto, the heat conductivity of such floor and roof, however, increasing in the direction of movement of the glass therethrough.

My invention further relates to means for moving said roof as a unit or in parts to regulate the distance between said roof and floor to suit the thickness of glass passed therethrough and to control air conditions therebetween.

Hereinafter I shall describe the method and apparatus of my invention as applied to the producing of annealed conditions in sheet glass.

In the manufacture of glass, as in that of other plastics, it is necessary to heat-treat the prepared material or finished product to relieve it of strains which are set up in the comparatively rapid cooling of the material after it is taken in the molten state from the melting and mixing furnace. In this heat-treatment or annealing the solidified glass is put into an oven or furnace and brought to a temperature high enough to relieve the strains in it and there allowed to cool slowly whereby the expanding and contracting forces occurring or set up thereby in the glass are allowed time to expend themselves and so leave the glass when it has cooled to normal temperature without undesired strains therein.

But this process of reheating the glass for annealing involves the expenditure of considerable time and the use of a considerable amount of fuel, as well as requiring expensive apparatus and large areas of floor space in a factory.

By the practice of my invention, however, the glass with the use of only comparatively simple apparatus is handled expeditiously directly from the furnace with the saving of a very great portion of the usual time and expense necessary in the present methods of heat-treating or annealing. In the art as commonly practiced a great amount of heat energy is wasted when the glass is allowed to cool after being molten, and this energy is not alone that necessary to bring the glass up to the temperature required for annealing purposes but there is also wasted that latent energy of fusion which is freed upon the cooling of the molten glass. In the practice of my invention I utilize this latent heat of fusion to keep the glass as it cools at the proper temperature and for the time necessary to prevent the setting up of strains in the glass.

It is therefore an object of my invention to provide a method of preventing the formation of strains in solidified or supercooled material by conserving and utilizing the latent heat of fusion of the molten material to secure the slow cooling thereof.

It is further the object of my invention to save the energy present as heat in the glass as it comes from the melting furnace for the purpose of maintaining the glass at or above the annealing temperature until it enters the lehr or for the purpose of reducing the amount of heat which may be necessary to bring the glass to the proper annealing temperature.

It is also an object of my invention to provide means for conserving the heat passing from molten material as it cools to bring about the slow cooling of such material whereby the setting up of strains in the cooled material is avoided.

In the practice of my invention I pass molten glass from the melting furnace into a position between walls of heat insulating material such as will allow a predetermined rate of cooling. Such heat insulating walls I describe in what follows as pairs of endless belts receiving a sheet of molten and rolled glass (from a suitable furnace and rolls not shown) and carrying such sheet throughout their length at a predetermined rate of speed such as will allow of the slow and gradual cooling of the glass without the setting up of strains therein. For some purposes I employ such a belt to deliver the glass to a cooling chamber, and for still other purposes I employ a simple chamber, and for still other purposes I employ a simple chamber with walls of low heat conductivity wherein the glass is held during the more or less slow cooling process.

The drawing, which forms part of this application, is a longitudinal elevation view of apparatus for practicing the method showing pairs of endless belts positioned about one another to form walls of progressively varying thickness, and a sheet of molten glass passing between said belts, rolls serving to support the glass and belts.

In the drawing is shown a pair of belts 1 and 2 of asbestos extending longitudinally one above the other with their wide surfaces in opposition and at a short distance apart, the lower belt 2 being longer than belt 1 and extending beyond it at both ends to serve as receiving and delivering areas or platforms. Within belts 1 and 2 are mounted another and shorter pair of asbestos belts 3 and 4, respectively, these latter belts being shorter than belts 1 and 2. Likewise, within belts 3 and 4 are respectively the belts 5 and 6 still shorter than belts 3 and 4. The belts 1, 3 and 5 travel at the receiving end about the same roll 7, belt 5 next to the roll 7, belt 3 traveling on belt 5, and belt 1 on belt 3. The other ends of belts 1, 3 and 5 are mounted and travel over rolls 9, 11 and 13, respectively, the latter being spaced at some distance apart. In the same manner belts 2, 4 and 6 are mounted on the rolls 8 and 10, 12 and 14. In this manner there are formed two horizontally disposed walls, one at a short distance above the other, and both being of thickness varying in their length and in stepped graduations with the greatest thickness at the receiving ends. Suitable means, not shown, is provided for driving the belts at the same linear speed with the opposed faces traveling in the same direction. The rollers 16, 17 and 18 underneath belts 6, 4 and 2 support the sheet of glass 15 and the belts, and the rolls 21, 22 and 23 support the upper parts of belts 5, 3 and 1, respectively. The receiving end of the floor of the lehr projects beyond that of the roof thereof to form a receiving apron 19 and the rear end projects to form a delivering apron 20 which delivers the glass to the rolls 24. Hand wheels 25 are provided for adjusting the distance between the two sets of belts.

In the operation of my device a sheet of glass 15 is fed onto the apron 19 of the belts 2, 4 and 6, from the forming rolls in the molten state. The belts, moving inwardly toward the opposing faces, carry the sheet of glass 15 forward between them at a rate of speed such as will allow the molten glass to cool slowly and gradually and allow any strains set up in such cooling to relieve themselves and be dissipated. The cooled and annealed glass is taken from the apron 20 as it passes from the belts and removed therefrom.

In some forms of the apparatus of my invention I make the asbestos belts wide enough so that the edges of the upper belts fall across the edges of the glass passing through the conveyor and so insulate the edges from the rapid transfer of heat therefrom.

Also, for further insuring the conservation of heat in this treatment of the glass I make, in some embodiments of my invention, the upper belts a little slack so that the upper belt in proximity to the glass will rest on the upper surface of the glass and so prevent any draft of air to pass thereover and detrimentally cool it.

It is to be understood that the apparatus of my invention is not limited to the conveyor illustrated but it may be embodied in any chamber having walls of low heat conductivity, or in any conveyor in which the glass is protected from rapid cooling by walls of material of low heat conductivity, whether such walls are those of the conveyor itself or of a chamber surrounding such conveyor, or my invention may be embodied in a combination of such heat insulated chamber with a conveyor as above.

Further, the method and apparatus of my invention are not limited to the treatment of glass in sheet form, for molded glassware such as tableware, electric insulators, etc., may beneficially be annealed thereby and therein. To secure further graduation of the cooling rate of the glass I stagger the terminals of the belts, that is, I make belt 5, for instance, end at a point above the ends of belt 6, which is below it, and make belt 3 terminate above a point between the end of belt 6 and belt 4 and so on out. In this manner I can increase the number of stepped graduations of heat conductivity from the glass as it passes through the lehr.

Under some conditions it is necessary to supplement the latent heat of fusion for the annealing process by heat exteriorly applied to keep the glass from too rapid cooling but as long as the latent heat of fusion or a considerable part thereof is conserved and utilized for the annealing process it is to be considered that such methods and the apparatus for carrying them out will come within the scope of my invention.

What I claim is:

1. In combination with a glass melting furnace, a chamber having walls of a material of low heat conductivity and whose heat conductivity varies progressively through the length thereof, and said walls comprising means for passing glass through said chamber.

2. Apparatus for affecting slow and gradual cooling of molten glass comprising a chamber having walls of material of low heat conductvity and of gradually varying thickness, said walls being in the form of movable belts.

3. Means for affecting the slow and gradual cooling of molten glass comprising pairs of belts which form walls of gradually varying thickness.

4. In glass annealing apparatus two horizontally disposed walls of heat insulating material, one at a short distance above the other, and both being of thickness varying from one end to the other, and means comprising the lower of said walls for passing sheets of molten glass between said walls.

5. In glass annealing apparatus two horizontally disposed walls of heat insulating material, one at a short distance above the other, and both being of thickness varying from one end to the other, means comprising the lower of said walls for passing sheets of molten glass between said walls, and means of heat insulating material for closing about the side edges of said sheets of glass when between said walls.

6. In glass annealing apparatus two horizontally disposed walls of heat insulating material, one at a short distance above the other, and both being of thickness varying from one end to the other, means comprising one of said walls for passing sheets of molten glass between said walls, and means for adjustably changing the distance between said walls.

7. In the manufacture of glass the process comprising passing molten glass in sheets between movable walls of gradually increasing heat conductivity, comprising endless belts and moving said walls and sheets synchronously.

8. In glass annealing apparatus, in combination, a lehr comprising a table comprising endless belts of different lengths and of heat insulating material, said belts being arranged one above the other to form a table whose thickness varies along the length thereof, and another set of belts of heat insulating material similarly arranged above and along said table to form a cover thereabove varying similarly in thickness along its length, and means for passing sheets of molten glass through said lehr.

9. In glass annealing apparatus, in combination, a lehr comprising a table comprising endless belts of different lengths and of heat insulating material, said belts being arranged one above the other to form a table whose thickness varies along the length thereof, and another set of belts of heat insulating material similarly arranged above and along said table to form a cover thereabove varying similarly in thickness along its length, means for passing sheets of molten glass through said lehr, and means for moving said belts synchronously with said sheet glass whereby the surfaces of said belts nearest the glass are caused to move in the same direction as said glass.

10. In glass annealing apparatus, in combination, a lehr comprising a table comprising a set of endless belts of different lengths and of heat insulating material, said belts being arranged one about the other to form a table whose thickness varies along the length thereof, and another set of belts of heat insulating material similarly arranged about each other and above and along said table to form a cover thereover varying similarly in thickness along its length, and means for passing sheets of molten glass to said table.

11. In glass annealing apparatus, in combination, a lehr comprising a table comprising a set of endless belts of different lengths and of heat insulating material, said belts being arranged one about the other to form a table whose thickness varies along the length thereof, and another set of belts of heat insulating material similarly arranged about each other and above and along said table to form a cover thereover varying similarly in thickness along its length, means for passing sheets of molten glass to said table, and means for moving said belts synchronously with said sheet glass whereby the surfaces of said belts nearest the glass are caused to move in the same direction as said glass.

12. In glass annealing apparatus, in combination, a lehr comprising a table comprising a set of endless belts of different lengths and of heat insulating material, said belts being arranged one about the other to form a table whose thickness varies along the length thereof, and another set of belts of heat insulating material similarly arranged about each other and above and along said table to form a cover thereover varying similarly in thickness along its length, means for passing sheets of molten glass to said table, means for moving said belts synchronously with said sheet glass whereby the surfaces of said belts nearest the glass are caused to move in the same direction as said glass, whereby said sheet glass moves over and along with said table, said upper belts being wide enough for their edges to fall down around the edges of said sheet glass.

13. In glass annealing apparatus, in combination, a lehr comprising a table comprising a set of endless belts of different lengths and of heat insulating material, said belts being arranged one about the other to form a table whose thickness varies along the length thereof, and another set of belts of heat insulating material similarly arranged about each other and above and along said table to form a cover thereover varying similarly in thickness along its length, means for passing sheets of molten glass to said table, means for moving said belts synchronously with said sheet glass whereby the surfaces of said belts nearest the glass are caused to move in the same direction as said glass, whereby said sheet glass moves over and along with said table, said upper belts being wide enough for their edges to fall down around the edges of said sheet glass, and along enough to rest on and ride along with said sheet glass to act as closure means for the space between said table and roof.

14. In glass annealing apparatus, in combination, a lehr a comprising a table comprising a set of endless belts of different lengths and of heat insulating material, said belts being arranged one about the other to form a table whose thickness varies along the length thereof, and a roof comprising another set of belts of heat insulating material similarly arranged about each other and above and along said table to form a cover thereover varying similarly in thickness along its length, means for passing sheets of molten glass to said table, and means for adjusting the distance between said table and roof.

In testimony whereof I hereto affix my signature.

CHARLES B. KINGSLEY.